(12) United States Patent
Chaturvedula et al.

(10) Patent No.: US 11,627,753 B2
(45) Date of Patent: *Apr. 18, 2023

(54) SOLUBILIZED STEVIOL GLYCOSIDE COMPOSITIONS

(71) Applicant: JAMES AND CAROL MAY FAMILY, LLLP, Mesa, AZ (US)

(72) Inventors: Venkata Sai Prakash Chaturvedula, Tempe, AZ (US); Michael Perry May, Queen Creek, AZ (US); James A. May, Mesa, AZ (US); Julian E. Zamora, Bogota (CO)

(73) Assignee: James and Carol May Family, LLLP, Mesa, AZ (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/722,135

(22) Filed: Dec. 20, 2019

(65) Prior Publication Data
US 2020/0120967 A1 Apr. 23, 2020

Related U.S. Application Data

(63) Continuation of application No. 14/628,085, filed on Feb. 20, 2015, now Pat. No. 10,772,346.

(60) Provisional application No. 61/943,113, filed on Feb. 21, 2014.

(51) Int. Cl.
*A23L 27/30* (2016.01)
*A23L 29/10* (2016.01)
*A23L 27/00* (2016.01)

(52) U.S. Cl.
CPC ............... *A23L 27/36* (2016.08); *A23L 29/10* (2016.08); *A23L 27/88* (2016.08); *A23V 2002/00* (2013.01)

(58) Field of Classification Search
CPC .......... A23L 27/36; A23L 27/88; A23L 29/10; A23V 2002/00
USPC ................. 426/548, 615, 425, 431, 590
See application file for complete search history.

(56) References Cited

U.S. PATENT DOCUMENTS

| | | |
|---|---|---|
| 9,433,235 B2 | 9/2016 | Schrader et al. |
| 10,292,412 B2 | 5/2019 | Spelman et al. |
| 10,609,942 B2 | 4/2020 | Chaturvedula et al. |
| 10,772,346 B2 * | 9/2020 | Chaturvedula ......... A23L 27/36 |
| 2011/0104353 A1 | 5/2011 | Lee |
| 2012/0058247 A1 | 3/2012 | Shi |
| 2012/0196019 A1 | 8/2012 | Shi |
| 2012/0322750 A1 * | 12/2012 | Schrader ................ A61K 8/732 514/25 |
| 2013/0209658 A1 * | 8/2013 | Spelman ................ A23L 27/36 426/658 |
| 2013/0251881 A1 | 9/2013 | Mutilangi |
| 2013/0295260 A1 | 11/2013 | Schrader et al. |
| 2014/0037814 A1 | 2/2014 | Quinlan et al. |
| 2015/0237901 A1 | 8/2015 | Chaturvedula et al. |
| 2016/0192684 A1 | 7/2016 | Chaturvedula et al. |

FOREIGN PATENT DOCUMENTS

| | | |
|---|---|---|
| WO | 2015014958 A1 | 2/2015 |
| WO | 2015127297 A1 | 8/2015 |

OTHER PUBLICATIONS

Deman, J.M., Principles of Food Chemistry, 1980, The AVI Publishing Co., p. 409.*
Kroyer, "Stevioside and Stevia-sweetener in food: application, stability and interaction with food ingredients," Journal of Consumer Protection and Food Safety, Feb. 11, 2010, pp. 1-5.
International Search Report dated Jul. 6, 2015, PCT Publication No. WO2015127297.
Written Opinion dated Jul. 6, 2015, PCT Publication No. WO2015127297.
International Preliminary Report on Patentability dated Aug. 23, 2016, PCT Publication No. WO2015127297.

* cited by examiner

*Primary Examiner* — Leslie A Wong

(74) *Attorney, Agent, or Firm* — Noblitt & Newson, PLLC

(57) ABSTRACT

Various embodiments of the present technology provide a sweetener composition comprising stevia glycosides that may be stably soluble in an aqueous solution, and methods for their manufacture. In various embodiments, the sweetener composition may comprise at least one stevia glycoside and a natural emulsifier. The natural emulsifier of the sweetener composition may enhance the aqueous solubility of the stevia glycoside to increase the concentration of dissolved stevia glycoside relative to its inherent aqueous solubility. The sweetener composition may be stably soluble upon formulation into any edible sweetened substances.

16 Claims, 1 Drawing Sheet

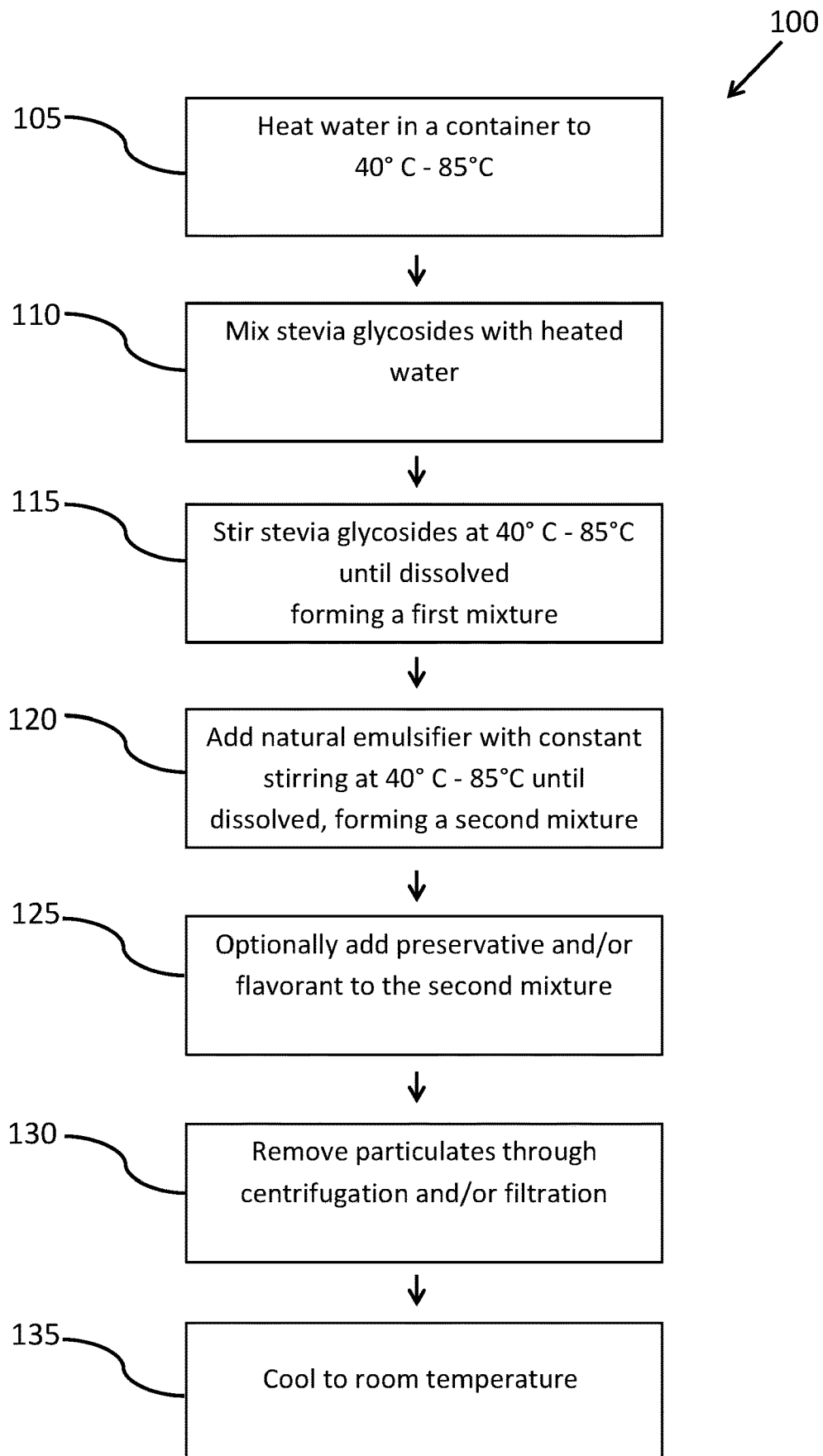

SOLUBILIZED STEVIOL GLYCOSIDE COMPOSITIONS

CROSS-REFERENCES TO RELATED APPLICATION

This application is a continuation application of U.S. patent application Ser. No. 14/628,085, filed Feb. 20, 2015, now U.S. Pat. No. 10,772,346 and entitled "Compositions and Method for the Solubilization of Stevia Glycosides", which claims priority to and the benefit of U.S. Provisional Patent Application No. 61/943,113, filed Feb. 21, 2014 and entitled "Systems and Methods for the Solubilization of Stevia", both of which are incorporated by reference.

BACKGROUND OF THE TECHNOLOGY

Food and drink sweeteners are a pervasive part of the human diet due to their pleasing taste. Sweeteners may be natural or artificial, caloric or non-caloric, and may take any form suitable for use in edible materials, including granular, powder, syrup, and liquid. Sweeteners may be derived from a variety of sources. Caloric sweeteners include common table sugars (sucrose), fructose, and palm sugar. Sugars add a pleasant taste to many foods but are high in calories, with one cup of table sugar exceeding 750 dietary calories, which may contribute to obesity and other health problems. Consequently, various classes of non-caloric or low caloric sweeteners, or sugar substitutes, have been developed to replace sugars in food and drinks.

Sweeteners that may be used in lieu of sugar may be derived from natural sources or may be artificially produced through synthesis and/or derivation methods. Non-caloric or low caloric sweeteners may benefit consumers by lowering the amount of calories that are consumed, making weight management easier. These sweeteners may replace conventional sugars in food and beverages to minimally impact blood sugar levels, which may be desirable to people with active lifestyles such as athletes, people with metabolic disorders such as diabetes mellitus, hypoglycemia, or people suffering from obesity.

Stevia glycosides extracted from the plant *Stevia rebaudiana* Bertoni may be used as a sugar substitute. However, stevia glycosides also have numerous disadvantages. One such challenge for those skilled in the art of food and beverage formulation is the difficulty with the stability of stevia glycosides in solution, low aqueous solubility, and precipitation and co-precipitation with other components from solution over time. Precipitants may cause the formulation to be cloudy or form solids or crystals that float or collect at the bottom of the container. Precipitation may affect the potency of the formulation's sweetness, taste, and negatively impact the perception of the consumer of the formulation's quality.

BRIEF DESCRIPTION OF THE DRAWING

A more complete understanding of the present technology may be derived by referring to the detailed description when considered in connection with the following illustrative FIGURE. In the following FIGURE. FIG. 1 is a flow chart representatively illustrating an exemplary method of making the sweetener composition according to various aspects of the present technology.

BRIEF SUMMARY

Various embodiments of the present technology provide a sweetener composition comprising stevia glycosides that may be stably soluble in an aqueous solution, and methods for their manufacture. In various embodiments, the sweetener composition may comprise at least one stevia glycoside and a natural emulsifier. The natural emulsifier of the sweetener composition may enhance the aqueous solubility of the stevia glycoside to increase the concentration of dissolved stevia glycoside relative to its inherent aqueous solubility. The sweetener composition may be stably soluble upon formulation into any edible sweetened substances.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various process steps, compositions, formulations, etc. In addition, the present technology may be practiced in conjunction with any number of artificial and/or natural sweeteners, fillers, additives such as thickeners, and the system described is merely one exemplary application for the technology. Further, the present technology may employ any number of techniques for providing sweetener compositions that may have a modified and/or enhanced taste profile, increased stability at various temperatures and/or pH, a lower and/or zero-caloric index, and/or zero-glycemic index or lower glycemic index compared to high caloric sugars.

Formulations and methods for producing a composition according to various aspects of the present technology may provide a sweetener composition. The sweetener composition may have an enhanced taste profile with a natural sweetness similar to the caloric sugars. For example, the sweetener composition may have a pleasant mouth-feel, reduced bitterness and/or reduced aftertaste compared to other sugar substitutes, a pleasant fresh aroma and other desired organoleptic properties. In one embodiment, the formulations and methods may include any suitable combination of natural sweeteners. In another embodiment, the formulations and methods may include one or more natural sweeteners comprising a stevia extract and/or a stevia glycoside. In some embodiments, the natural sweeteners comprising the stevia extract and/or the stevia glycoside may be mixed with an emulsifier. In yet another embodiment, the formulations and methods may include a combination of natural sweeteners, emulsifiers, flavor ingredients, and/or preservatives. In some embodiments, the sweetener composition may include additives for modifying viscosity, pH, and/or any other physical property to optimize combining the sweetener composition with edible sweetened substances such as foods and/or beverages.

In some embodiments, the sweetener composition may comprise only natural components. In various embodiments, the sweetener composition may be entirely natural in origin. In one embodiment, the natural origin may mean that the ingredients are extracted directly from plants, animals, and/or microbial sources, not produced synthetically or bio-chemically or enzymatically, and/or not contain synthetic ingredients. In another embodiment, the natural origin may mean that the components of the sweetener composition may be extracted from plants, animals, and/or microbial sources and does not undergo a synthetic or bio-chemical or enzymatic process that chemically changes the components. In another embodiment, the natural origin may mean that the components of the sweetener composition may be present in and/or produced by nature and extracted or processed using natural ingredients as solvents such as water. In some embodiments, the sweetener composition may comprise one or more natural components that are certified as organic under the authority of the U.S. Department of Agriculture's Organic Rule.

In various exemplary embodiments, the sweetener composition of the present technology may comprise an aqueous solution (i.e., a liquid solution wherein the solvent is water) of natural stevia glycoside and a natural emulsifier. The stevia glycoside may be provided in a stevia leaf extract produced from leaves of plants of the sunflower family Asteraceae such as the species *Stevia rebaudiana* Bertoni, which may be referred to as "stevia." The stevia glycoside may comprise one or more substantially pure stevia glycosides purified from stevia leaves. In various embodiments, the sweetener composition may comprise up to about 20% by weight of the stevia glycosides.

The stevia leaf extract, in accordance with various exemplary embodiments, may be a crude and/or an at least partially refined preparation from stevia plant leaves. The stevia leaf extract may contain any one or more of the approximately 40 stevia glycosides typically contained in the stevia leaves. The stevia leaf extract may be prepared by any conventional preparation methods, such as boiling the stevia leaves in water and/or organic ethanol extraction processes and crystallization. In some embodiments, the stevia leaf extract may comprise approximately 95%-100% by weight total stevia glycosides. In some embodiments, the stevia leaf extract may comprise approximately 50%-100% by weight rebaudioside A. Some exemplary embodiments of the stevia leaf extract may comprise approximately 95% by weight stevia glycosides (referred to as SG95). In some embodiments, the SG95 may comprise rebaudioside A in approximately 50%-80% by weight of the SG95.

In some embodiments, the stevia leaf may be ground, pulverized, shredded, dried, or otherwise processed. Some extraction methodologies may comprise solvent extraction with one or more polar solvents, non-polar solvents, water, ethanol, chloroform, ethyl acetate, methanol, and the like. In some embodiments, the stevia leaf extract may be concentrated and/or purified by any suitable method to produce a stevia leaf extract having a desired stevia glycoside profile. In some embodiments, the stevia leaf extract may comprise any suitable derivative of the plant extract, such as a product of hydrolysis of the plant extract.

Various crops of stevia leaves used to produce the stevia leaf extract may contain varying quantities of stevia glycosides. In addition to stevia glycosides, the stevia leaf extract may also comprise other biological components contributing to the taste profile or other desired properties of the sweetener composition, such as any one or more of sesquiterpenes, alcohols, labdanic diterpenes, aliphatic hydro-carbons, sterols, poly phenols, and triterpenes. In one embodiment, the stevia leaves may be selected for having a desired stevia glycoside profile as stated above for rebaudioside A.

In various embodiments of the present technology, the sweetener composition may comprise various stevia glycosides. For example, the various stevia glycosides may comprise one or more of: rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, and dulcoside A. In various embodiments, the sweetener composition may comprise additional natural sweeteners. For example, the additional natural sweeteners may comprise one or more of: mogroside VI, iso-mogroside V, siamenoside, mogroside IV, abrusoside A, pterocaryoside A, pterocaryoside B, curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, mukurozioside, phlomisoside I, periandrin I, and cyclocarioside I, and/or a combination thereof.

In some embodiments, the sweetener composition may further comprise an oligosaccharide. For example, the oligosaccharide may comprise a polymer of monosaccharides such as: glyceraldehyde, dihydroxyacetone, erythrose, threose, erythrulose, arabinose, lyxose, mannoheptulose, sedoheltulose, ribose, xylulose, galactose, glucose, gulose, idose, mannose, talose, fructose, psicose, allose, altrose, sorbose, tagatose, octolose, fucose, xylose, ribulose, rhamnose, arabinose, turanose, and sialos, and/or a combination thereof.

In accordance with various exemplary embodiments of the present technology, the sweetener composition may comprise a natural emulsifier. The natural emulsifier may function to disperse the stevia glycosides through an aqueous solution such as water. The dissolved concentration of the stevia glycosides in the aqueous solution may be higher in the presence of the natural emulsifier than in the absence of the natural emulsifier. For example, rebaudioside A present in amounts of 11% by weight or greater may precipitate from an aqueous solution. In various embodiments of the present technology, the natural emulsifier may allow rebaudioside A to be present in aqueous solution in amounts of up to about 20% by weight without precipitation. In some embodiments, adding the natural emulsifier to an aqueous (ie., water-based) solution of stevia glycosides may stabilize the solubility of the sweetener composition including reducing or eliminating the precipitation of solids from the solution by binding any of the components to prevent separation of the finished sweetener composition.

In some embodiments, the natural emulsifier may comprise an extract from a Quillaja tree, *Quillaja Saponaria* Molina. In one embodiment, the Quillaja tree extract may be provided by the commercially available product Q-Naturale® 200 and/or QNaturale® 200V from Ingredion Company. In various embodiments, the sweetener composition may comprise approximately 0.1%-2% by weight of the Quillaja tree extract. In various embodiments, the Quillaja tree extract may have a pH in the range of approximately 3.7-4.2.

The Q-Naturale® 200 and/or Q-Naturale® 200V, Quillaj a tree extracts are natural emulsifiers indicated for use in making high oil load flavor emulsions and to stabilize a number of flavors in beverages. Flavor oils used in edible substances may include, for example, lemon essential oil, jasmine fragrance oil, cantaloupe flavor oil, orange oil, and a variety of herb oils. As a hydrophobic and nonpolar substance, oils are known to segregate from water. Through continuous research, it was surprisingly found that the Q-Naturale® 200 and/or Q-Naturale® 200V Quillaja tree extracts improved the solubility of ent-kaurane diterpene glycosides like stevia glycosides isolated from *Stevia rebaudiana*, which have no structural similarity to oils. Diterpene glycosides are cyclic oligosaccharide molecules with hydrophilic glycoside groups and hydrophobic diterpene groups.

In some embodiments, the natural emulsifier may comprise any one or more natural and/or organic product such as lecithin, fatty acid salts, carboxymethyl cellulose, modified starches, pectin, and/or any suitable gum such as arabic gum, guar gum, and/or xanthan gum. In other embodiments, the natural emulsifier may comprise glycerin and/or propylene glycol.

In various embodiments, the sweetener composition may further comprise a filler material to provide volume to the sweetener composition. The filler material may comprise a polyol (sugar alcohol) which may be any suitable sugar alcohol, polyhydric alcohol, and/or polyalcohol. In some embodiments, the polyol may comprise at least one of: erythritol, maltitol, mannitol, sorbitol, lactitol, xylitol, inositol, isomalt, hydrogenated isomaltulose, reduced isomaltooligosaccharides, propylene glycol, glycerol, threitol, galactitol, reduced xylo-oligosaccharides, and reduced gentiooligosaccharides, and/or a combination thereof.

In various embodiments, the sweetener composition may further comprise a preservative. The preservative may comprise any suitable compound for use in edible sweetened substances such as foods and beverages that may prevent, delay, or otherwise reduce spoilage, bacterial growth, decay, discoloration, and any other undesirable change in the food and beverage that may reduce shelf life, adversely affect nutritional value, or promote food-borne illness. In various embodiments, the preservative may function as one or more of an antimicrobial, antioxidant, and antienzymatic. For example, antimicrobial preservatives may comprise sulfites, nitrates, nitrites, bacteriocins, salts, and acetic acid. Exemplary antioxidant preservatives may comprise ascorbic acid (vitamin C) and tocopherol (vitamin E). Exemplary antienzymatic preservatives may comprise compounds that inactivate enzymes including one or more of metal chelators such as ethylenediaminetetraacetic acid (EDTA), ascorbic acid, and citric acid. In some embodiments, the preservative may comprise a natural liquid preservative such as rosemary, fruit, and herbal extracts. In various embodiments, the sweetener composition may comprise up to approximately 2% by weight of the natural liquid preservative.

In various embodiments, the sweetener composition may further comprise a flavorant. Exemplary flavorants may comprise any suitable liquid ingredient that provides a flavor to food and beverages such as herbal and/or spice extracts and/or their essences. In some embodiments, the flavorant may comprise liquid components of fruits, vegetables, nuts such as vanilla extract, grape seed extract, hazelnut, and the like. In various embodiments, the flavorants may comprise approximately 5%-25% by weight of the sweetener composition. Exemplary flavorants may exhibit a specific gravity of approximately 0.82-1.2. Exemplary flavorants may exhibit a refractive index of approximately 1.30-1.468.

In various embodiments, the sweetener composition may further comprise a functional additive. The functional additive may be any compound added to the sweetener composition for a functional or aesthetic purpose. For example, the functional additive may be at least one of: a potentiate, a dye, a nutritional supplement such as a vitamin, and pharmaceutical.

The sweetener composition, according to the present technology, may be mixed, formulated, or otherwise prepared in any suitable manner for use as a sweetener. In one embodiment, the sweetener composition may comprise a liquid at various temperatures and/or pH ranges. In another embodiment, the composition may comprise a high viscosity liquid having such that the formulation has the consistency of syrup or gel.

As discussed above, the sweetener composition according to the present technology may comprise a mixture of at least one stevia glycoside and a natural emulsifier in an aqueous solution. In some embodiments, the sweetener composition may comprise up to approximately 20% by weight stevia glycosides. In some embodiments, the sweetener composition may comprise up to approximately 0.1-2% by weight of the Quillaj a tree extract.

Exemplary methods for formulating the sweetener composition as an aqueous solution (ie., wherein the solvent is water) may comprise mixing stevia glycosides, Quillaj a tree extract, and water at temperatures ranging between approximately 40° C. and 85° C. with gentle agitation to provide turbulence to the solution during the mixing process. In various exemplary formulations, the water may be purified water such as ultra-filtered water. Exemplary sweetener compositions may comprise water at approximately 51%-88.5% by weight.

The temperature used in exemplary methods of solubilizing stevia glycosides in an aqueous solution with the Quillaja tree extract may vary in accordance with the amount of rebaudioside A present in the stevia glycosides. Generally, as the concentration of rebaudioside A in the stevia glycosides increases, a higher temperature may be used for solubilization with the Quillaja tree extract because rebaudioside A is less soluble in water than mixture of stevia glycosides.

Referring to FIG. 1, in an exemplary embodiment of a method for making the sweetener composition, purified water may be heated to approximately 40° C. -85° C. (105). Stevia glycosides may be added to the heated water and mixed with stirring and/or agitation (110). In some embodiments, the stirring and/or agitation may be substantially constant. The stevia glycosides may be stirred and/or agitated in the heated water until dissolved such that the mixture is visibly clear by inspection, forming a first mixture. The stevia glycosides may be mixed into the heated water with continued heating at approximately 40° C.-85° C. for approximately 30-45 minutes (115). The natural emulsifier, such as Quillaja tree extract, may be added by stirring and/or agitation into the first mixture with continued heating at approximately 40° C.-85° C. to produce a second mixture (120). The second mixture may be stirred and/or agitated until the natural emulsifier is dissolved such that the mixture is visibly clear by inspection. The second mixture may be an embodiment of the sweetener composition. An additive, such as a flavorant and/or a preservative, may be added to the second mixture until dissolved (125). The second mixture mixed with various additives may comprise a variety of embodiments of the sweetener composition. Any particulates in the sweetener composition may be removed by any suitable method such as conventional filtration (such as with membrane filtration or sieving through cellulose filter paper) and/or centrifugation to produce a clear liquid (130). The sweetener composition may then be cooled to room temperature (135).

In various embodiments, the solubility of the aqueous sweetener composition may remain stable for more than five days at room temperature. In some embodiments, the solubility of the aqueous sweetener composition may remain a stable for at least six months at room temperature. The stability of the soluble solution contemplates the absence of precipitate in the solution such as flakes, crystals, flocculence, and/or cloudiness (i.e., fine precipitates that remain suspended in the solution), and other forms of insoluble material. Some embodiments of the sweetener composition may be expected to remain a stable solution for up to two years or more. Stevia glycosides generally precipitate from aqueous solution within two to three days after formulation of the solution in the absence of the emulsifier.

In some embodiments, the sweetener composition may be provided with a pH of approximately 2.0-8.5. The pH of the sweetener composition may be altered with natural acids such as citric acid and/or ascorbic acid. The wide pH range at which the sweetener composition remains stable may be useful when formulated into a variety of edible materials. For example, the sweetener composition may be provided with an acidic pH as low as 2 which may be suitable for sweetener acidic beverages such as soda or citrus juices. In another embodiment the sweetener composition may be provided with a neutral to basic pH as high as 8.5, which may be suitable for sweetener alkaline foods such as some dairy products.

Variations on the exemplary method of making the sweetener composition illustrated in FIG. 1 are provided below. The variations of the method below pertain to the type of stevia glycosides that are used in each sweetener composition comprising the Quillaja tree extract emulsifier supplied by Ingredion, namely, Q-Naturale® 200 and QNaturale® 200V (ie., vegan). For example, sweetener compositions comprising lower amounts of the less soluble stevia glycoside rebaudioside A may be formulated with lower amounts of Quillaja tree extract and lower temperatures to effect solubilization. Conversely, sweetener compositions comprising higher amounts of the less soluble stevia glycoside rebaudioside A may be formulated with higher amounts of Quillaja tree extract and higher temperatures to effect solubilization.

In one embodiment, a mixture of SG95RA50 (Total Stevia Glycosides 95% by weight in which 50% by weight is rebaudioside A) is suspended in purified water with the emulsifier Q-Naturale 200 and heated between about 40° C. and 85° C. until the mixture is visibly clear by inspection, i.e. a solution with no visible solid particulates or cloudiness. In one embodiment, the mixture is heated to a temperature between about 55° C.-75° C. In one embodiment, SG95RA50 and the emulsifier may be in a weight ratio of about 98:2 to 99.9 to 0.1. In another embodiment, the SG95RA50 and the emulsifier may be in a weight ratio of 99.8 to 0.2.

In one embodiment, a mixture of SG95RA60 (Total Stevia Glycosides 95% by weight in which 60% by weight is rebaudioside A) is suspended in purified water with the emulsifier Q-Naturale 200 and heated between about 40° C. and 85° C. until the mixture is visibly clear by inspection, i.e. a solution with no visible solid particulates or cloudiness. In one embodiment, the mixture is heated to a temperature between about 60° C.-80° C. In one embodiment, SG95RA60 and the emulsifier may be in a weight ratio of about 98:2 to 99.9 to 0.1. In another embodiment, the SG95RA60 and the emulsifier may be in a weight ratio of 99.5 to 0.5.

In one embodiment, a mixture of SG95RA70 (Total Stevia Glycosides 95% by weight in which 70% by weight is rebaudioside A) is suspended in purified water with the emulsifier Q-Naturale 200 and heated between about 40° C. and 85° C. until the mixture is visibly clear by inspection, i.e. a solution with no visible solid particulates or cloudiness. In one embodiment, the mixture is heated to a temperature between about 60° C. and 85° C. In one embodiment, SG95RA70 and the emulsifier may be in a weight ratio of about 98:2 to 99.9 to 0.1. In another embodiment, the SG95RA70 and the emulsifier may be in a weight ratio of 99.4 to 0.6.

In one embodiment, a mixture of SG95RA80 (Total Stevia Glycosides 95% by weight in which 80% by weight is rebaudioside A) is suspended in purified water with the emulsifier Q-Naturale 200 and heated between about 40° C. and 85° C. until the mixture is visibly clear by inspection, i.e. a solution with no visible solid particulates or cloudiness. In one embodiment, the mixture is heated to a temperature between about 60° C. and 85° C. In one embodiment, SG95RA80 and the emulsifier may be in a weight ratio of about 98:2 to 99.9 to 0.1. In another embodiment, the SG95RA80 and the emulsifier may be in a weight ratio of 99.3 to 0.7.

In one embodiment, a mixture of RA95 (95% by weight rebaudioside A) is suspended in purified water with the emulsifier Q-Naturale 200 and heated between about 40° C. and 85° C. until the mixture is visibly clear by inspection, i.e. a solution with no visible solid particulates or cloudiness. In one embodiment, the mixture is heated to a temperature between about 65° C. and 85° C. In one embodiment, RA95 and the emulsifier may be in a weight ratio of about 98:2 to 99.9 to 0.1. In another embodiment, the RA95 and the emulsifier may be in a weight ratio of 99.0 to 1.0.

In one embodiment, a mixture of RA97 (97% by weight rebaudioside A) is suspended in purified water with the emulsifier Q-Naturale 200 is heated between about 40° C. and 85° C. until the mixture is visibly clear by inspection, i.e. a solution with no visible solid particulates or cloudiness. In one embodiment, the mixture is heated to a temperature between about 65° C. and 85° C. In one embodiment, RA95 and the emulsifier may be in a weight ratio of about 98:2 to 99.9 to 0.1. In another embodiment, the RA97 and the emulsifier may be in a weight ratio of 99.0 to 1.0.

In one embodiment, a mixture of RA100 (100% by weight rebaudioside A) is suspended in purified water with the emulsifier Q-Naturale 200 is heated between about 40° C. and 85° C. until the mixture is visibly clear by inspection, i.e. a solution with no visible solid particulates or cloudiness. In one embodiment, the mixture is heated to a temperature between about 65° C. and 85° C. In one embodiment, RA100 and the emulsifier may be in a weight ratio of about 98:2 to 99.9 to 0.1. In another embodiment, the SG95RA80 and the emulsifier may be in a weight ratio of 98.8 to 1.2.

In one embodiment, the mixture of SG95RA50 (Total Stevia Glycosides 95% by weight in which 50% by weight is rebaudioside A) is suspended in purified water with the emulsifier Q-Naturale 200V is heated between about 40° C. and 85° C. until the mixture is visibly clear by inspection, i.e. a solution with no visible solid particulates or cloudiness. In one embodiment, the mixture is heated to a temperature between about 55° C. and 75° C. In one embodiment, SG95RA50 and the emulsifier may be in a weight ratio of about 98:2 to 99.9 to 0.1. In another embodiment, the SG95RA60 and the emulsifier may be in a weight ratio of 99.7 to 0.3.

In one embodiment, the mixture of SG95RA60 (Total Stevia Glycosides 95% by weight in which 60% by weight is rebaudioside A) is suspended in purified water with the emulsifier Q-Naturale 200V is heated between about 40° C. and 85° C. until the mixture is visibly clear by inspection, i.e. a solution with no visible solid particulates or cloudiness. In a particular embodiment, the mixture is heated to a temperature between about 60° C. and 80° C. In one embodiment, SG95RA60 and the emulsifier may be in a weight of about 98:2 to 99.9 to 0.1. In a particular embodiment, the SG95RA60 and the emulsifier may be in a weight of 99.7 to 0.3.

In one embodiment, the mixture of SG95RA70 (Total Stevia Glycosides 95% by weight in which 70% by weight is rebaudioside A) is suspended in purified water with the emulsifier Q-Naturale 200V is heated between about 40° C.

and 85° C. until the mixture is visibly clear by inspection, i.e. a solution with no visible solid particulates or cloudiness. In one embodiment, the mixture is heated to a temperature between about 60° C. and 85° C. In one embodiment, SG95RA70 and the emulsifier may be in a weight ratio of about 98:2 to 99.9 to 0.1. In another embodiment, the SG95RA70 and the emulsifier may be in a weight ratio of 99.6 to 0.4.

In one embodiment, the mixture of SG95RA80 (Total Stevia Glycosides 95% by weight in which 80% by weight is rebaudioside A) is suspended in purified water with the emulsifier Q-Naturale 200V is heated between about 40° C. and 85° C. until the mixture is visibly clear by inspection, i.e. a solution with no visible solid particulates or cloudiness. In one embodiment, the mixture is heated to a temperature between about 60° C. and 85° C. In one embodiment, SG95RA80 and the emulsifier may be in a weight ratio of about 98:2 to 99.9 to 0.1. In another embodiment, the SG95RA80 and the emulsifier may be in a weight ratio of 99.5 to 0.5.

In one embodiment, the mixture of RA95 (95% by weight rebaudioside A) is suspended in purified water with the emulsifier Q-Naturale 200V is heated between about 40° C. and 85° C. until the mixture is visibly clear by inspection, i.e. a solution with no visible solid particulates or cloudiness. In a particular embodiment, the mixture is heated to a temperature between about 60° C. and 85° C. In one embodiment, RA95 and the emulsifier may be in a weight ratio of about 98:2 to 99.9 to 0.1. In one embodiment, the RA95 and the emulsifier may be in a weight ratio of 99.2 to 0.8.

In one embodiment, the mixture of RA97 (97% by weight rebaudioside A) is suspended in purified water with the emulsifier Q-Naturale 200V is heated between about 40° C. and 85° C. until the mixture is visibly clear by inspection, i.e. a solution with no visible solid particulates or cloudiness. In one, the mixture is heated to a temperature between about 60° C. and 85° C. In one embodiment, RA95 and the emulsifier may be in a weight ratio of about 98:2 to 99.9 to 0.1. In one embodiment, the RA97 and the emulsifier may be in a weight ratio of 98.8 to 1.2.

In one embodiment, the mixture of RA100 (100% by weight rebaudioside A) is suspended in purified water with the emulsifier Q-Naturale 200V is heated between about 40° C. and 85° C. until the mixture is visibly clear by inspection, i.e. a solution with no visible solid particulates or cloudiness. In one, the mixture is heated to a temperature between about 60° C. and 85° C. In one embodiment, RA100 and the emulsifier may be in a weight ratio of about 98:2 to 99.9 to 0.1. In one embodiment, the SG95RA80 and the emulsifier may be in a weight ratio of 98.7 to 1.3.

EXAMPLES

The present technology may be further illustrated by the following examples, which are not to be construed in any way as limiting the scope thereof. The present technology may be formulated in various other embodiments, modifications, and equivalents thereof without departing from the spirit of the present technology and/or the scope of the appended claims. All % figures in Examples 1-8 are "% by weight."

Example 1

Solubilization Stevia Leaf Extract SG95RA50 with Q-Naturale 200

100 ml of purified water is added to a glass beaker with a magnetic stir bar and stirred at 50° C. for 15 minutes. 13 grams of Stevia Leaf Extract containing approximately 95% by weight total Stevia Glycosides of which approximately 50% by weight is rebaudioside A is added to the purified water and stirred at 50° C. for 15 minutes. The temperature is increased to 70° C. over 15 minutes and stirred for an additional 30 minutes. 0.5 grams of Q-Naturale® 200 is added and stirring is continued at 70° C. for 30-45 minutes. The mixture of the water, Stevia Leaf Extract, and QNaturale® 200 is filtered and cooled to room temperature over about 30-60 minutes. The mixture is then stirred at room temperature for 45-60 minutes, producing a clear solubilized solution of the Stevia Leaf Extract.

Example 2

Solubilization Stevia Leaf Extract SG95RA70 with Q-Naturale 200

100 ml of purified water is added to a glass beaker with a magnetic stir bar and stirred at 50° C. for 15 minutes. 11 grams of Stevia Leaf Extract containing approximately 95% by weight total Stevia Glycosides of which approximately 70% by weight is rebaudioside A is added to the purified water and stirred at 50° C. for 30 minutes. The temperature is increased to 60° C. over 15 minutes and stirred for an additional 30 minutes. 0.8 grams of Q-Naturale® 200 is added and stirring is continued at 60° C. for 30-45 minutes. The mixture of the water, Stevia Leaf Extract, and QNaturale® 200 is filtered and cooled to room temperature over about 30-60 minutes. The mixture is then stirred at room temperature for 45-60 minutes, producing a clear solubilized solution of the Stevia Leaf Extract.

Example 3

Solubilization Stevia Leaf Extract (Rebaudioside A) RA95 with Q-Naturale 200

100 ml of purified water is added to a glass beaker with a magnetic stir bar and stirred at 60° C. for 15 minutes. 8 grams of Stevia Leaf Extract containing approximately 95% by weight is rebaudioside A is added to the purified water and stirred at 60° C. for 15 minutes. The temperature is increased to 80° C. over 15 minutes and stirred for an additional 30 minutes. 1 gram of Q-Naturale® 200 is added and stirring is continued at 80° C. for 30-45 minutes. The mixture of the water, rebaudioside A, and QNaturale® 200 is filtered and cooled to room temperature over about 30-60 minutes. The mixture is then stirred at room temperature for 45-60 minutes, producing a clear solubilized solution of the rebaudioside A.

Example 4

Solubilization Stevia Leaf Extract RA97 with Q-Naturale 200

100 ml of purified water is added to a glass beaker with a magnetic stir bar and stirred at 60° C. for 15 minutes. 9 grams of Stevia Leaf Extract containing approximately 97% by weight rebaudioside A is added to the purified water and stirred at 60° C. for 30 minutes. The temperature is increased to 85° C. over 15 minutes and stirred for an additional 30 minutes. 0.8 grams of Q-Naturale® 200 is added and stirring is continued at 85° C. for 30-45 minutes. The mixture of the water, Stevia Leaf Extract, and QNaturale® 200 is filtered and cooled to room temperature over about 30-60 minutes.

The mixture is then stirred at room temperature for 45-60 minutes, producing a clear solubilized solution of the Stevia Leaf Extract.

Example 5

Solubilization Stevia Leaf Extract SG95RA60 with Q-Naturale 200V 100 ml of purified water is added to a glass beaker with a magnetic stir bar and stirred at 60° C. for 15 minutes. 13 grams of Stevia Leaf Extract containing approximately 95% by weight total Stevia Glycosides of which approximately 60% by weight is rebaudioside A is added to the purified water and stirred at 60° C. for 15 minutes. The temperature is increased to 70° C. over 15 minutes and stirred for an additional 30 minutes. 1.4 grams of Q-Naturale® 200V is added and stirring is continued at 70° C. for 30-45 minutes. The mixture of the water, Stevia Leaf Extract, and QNaturale® 200V is filtered and cooled to room temperature over about 30-60 minutes. The mixture is then stirred at room temperature for 45-60 minutes, producing a clear solubilized solution of the Stevia Leaf Extract.

Example 6

Solubilization Stevia Leaf Extract SG95RA80 with Q-Naturale 200V 100 ml of purified water is added to a glass beaker with a magnetic stir bar and stirred at 50° C. for 15 minutes. 11 grams of Stevia Leaf Extract containing approximately 95% by weight total Stevia Glycosides of which approximately 80% by weight is rebaudioside A is added to the purified water and stirred at 50° C. for 30 minutes. The temperature is increased to 80° C. over 15 minutes and stirred for an additional 30 minutes. 0.8 grams of Q-Naturale® 200V is added and stirring is continued at 80° C. for 30-45 minutes. The mixture of the water, Stevia Leaf Extract, and QNaturale® 200V is filtered and cooled to room temperature over about 30-60 minutes. The mixture is then stirred at room temperature for 45-60 minutes, producing a clear solubilized solution of the Stevia Leaf Extract.

Example 7

Solubilization Stevia Leaf Extract RA95 with Q-Naturale 200V 100 ml of purified water is added to a glass beaker with a magnetic stir bar and stirred at 50° C. for 15 minutes. 14 grams of Stevia Leaf Extract containing approximately 95% by weight rebaudioside A is added to the purified water and stirred at 50° C. for 15 minutes. The temperature is increased to 75° C. over 15 minutes and stirred for an additional 30 minutes. 1.6 gram of Q-Naturale® 200V is added and stirring is continued at 70° C. for 30-45 minutes. The mixture of the water, rebaudioside A, and QNaturale® 200V is filtered and cooled to room temperature over about 30-60 minutes. The mixture is then stirred at room temperature for 45-60 minutes, producing a clear solubilized solution of the rebaudioside A.

Example 8

Solubilization Stevia Leaf Extract RA97 with Q-Naturale 200V 100 ml of purified water is added to a glass beaker with a magnetic stir bar and stirred at 60° C. for 15 minutes. 7 grams of Stevia Leaf Extract containing approximately 97% by weight rebaudioside A is added to the purified water and stirred at 60° C. for 30 minutes. The temperature is increased to 85° C. over 15 minutes and stirred for an additional 30 minutes. 0.8 grams of Q-Naturale® 200V is added and stirring is continued at 85° C. for 30-45 minutes. The mixture of the water, Stevia Leaf Extract, and QNaturale® 200 is filtered and cooled to room temperature over about 30-60 minutes. The mixture is then stirred at room temperature for 45-60 minutes, producing a clear solubilized solution of the Stevia Leaf Extract.

The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail.

In the foregoing description, the technology has been described with reference to specific exemplary embodiments; however, it will be appreciated that various modifications and changes may be made without departing from the scope of the present technology as set forth herein. The description and figures are to be regarded in an illustrative manner, rather than a restrictive one and all such modifications are intended to be included within the scope of the present technology. Accordingly, the scope of the technology should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

We claim:
1. An aqueous sweetener solution comprising:
a mixture of steviol glycosides in a range from 7% to 20% by weight;
a Quillaja tree extract in a range from 0.1% to 2% by weight; and
water in a range from 88% to 93% by weight;

wherein a weight ratio of the mixture of steviol glycosides to the Quillaja tree extract is in a range from 98:2 to 99.9:01;

wherein the aqueous sweetener solution is clear.

2. The aqueous sweetener solution according to claim 1, wherein the aqueous sweetener remains clear for at least six months at room temperature.

3. The aqueous sweetener solution according to claim 1, wherein the aqueous sweetener remains clear for at least two years at room temperature.

4. The aqueous sweetener solution according to claim 1, further comprising a natural liquid preservative in a range of 0.1% to 2% by weight.

5. The aqueous sweetener solution according to claim 4, wherein the natural liquid preservative is at least one of ascorbic acid, tocopherol a herbal extract, a fruit extract, and combinations thereof.

6. The aqueous sweetener solution according to claim 1, further comprising a preservative in a range of 0.1% to 2% by weight.

7. The aqueous sweetener solution according to claim 6, wherein the preservative is at least one of a sulfite, a nitrate, a nitrite, a bacteriocin, a salt, acetic acid, ascorbic acid, tocopherol, ethylenediaminetetraacetic acid, ascorbic acid, citric acid, and combinations thereof.

8. The aqueous sweetener solution according to claim 1, further comprising a flavorant.

9. The aqueous sweetener solution according to claim 8, wherein the flavorant is an extract of at least one of a herb, a spice extract, a fruit, a vegetable, fruits, a nut, a seed, and combinations thereof.

10. The aqueous sweetener solution according to claim 8, wherein the flavorant is in a range of 5% to 25% by weight.

11. The aqueous sweetener solution according to claim 1, wherein the mixture of steviol glycosides comprises from 50% to 80% by weight of rebaudioside A.

12. The aqueous sweetener solution according to claim 1, wherein the mixture of steviol glycosides comprises 100% by weight of rebaudioside A.

13. The aqueous sweetener solution according to claim 1, wherein a stevia leaf extract comprises the mixture of steviol glycosides.

14. A sweetened beverage comprising:
the aqueous sweetener solution according to claim 1; and
a beverage composition;
wherein the beverage composition is sweetened by aqueous sweetener solution.

15. A sweetened clear beverage comprising:
the aqueous sweetener solution according to claim 1; and
a clear beverage composition;
wherein the beverage composition is sweetened by aqueous sweetener solution.

16. A sweetened edible substance comprising:
the aqueous sweetener solution according to claim 1; and
an edible material;
wherein the edible material is sweetened by aqueous sweetener solution.

* * * * *